United States Patent Office 3,580,882
Patented May 25, 1971

---

3,580,882
MICA-REINFORCED COMPOSITES
Lawrence E. Nielsen, Creve Coeur, and Joseph E. Fields, Ballwin, Mo., assignors to Monsanto Company, St. Louis, Mo.
No Drawing. Continuation-in-part of application Ser. No. 753,857, Aug. 20, 1968. This application Nov. 29, 1968, Ser. No. 780,272
Int. Cl. C08f *45/04*
U.S. Cl. 260—41                   5 Claims

ABSTRACT OF THE DISCLOSURE

A shaped composite structure comprising finely comminuted mica as reinforcing filler in a matrix comprising the zinc salt of an acrylic acid polymer, and the method of preparing the same which comprises heating in a mold at a temperature of from about 175° C. to 400° C. and a pressure of from about 5,000 p.s.i. to 50,000 p.s.i. a mixture of zinc oxide and an acrylic acid polymer in contact with the mica.

CROSS-REFERENCES TO RELATED APPLLICATION

This application is a continuation-in-part of our application Ser. No. 753,857, filed Aug. 20, 1968 now abandoned. The invention herein described was made in the course of or under a contract or subcontract thereunder, with the Office of Naval Research.

BACKGROUND OF THE INVENTION

(1) Field of the invention

Mica-reinforced, shaped composite structure comprising metal salts of acrylic acid polymers.

(2) Background of the invention

Metal salts of some polymeric acids, including polyacrylic acid and acrylic acid copolymers, are described in the article by W. E. Fitzgerald and L. E. Nielsen, "Viscoelastic Properties of the Salts of Some Polymeric Acids," Proc. Royal Soc., A 282, 137–146 (1964), and in the D. A. Fiegley, Jr., Pat. No. 2,880,090 and the A. L. Smith et al. Pat. No. 2,961,364. Depending upon the metal and upon the nature of the organic portion of the polymer, the salts vary greatly in solubility and thermal stability. In said Feigley and said Smith et al. patents, the polymeric salts are applied to fibers in dispersion, and the coated fibers thus obtained are employed as reinforcing fillers in a different type of matrix, e.g., in a vinyl halide resin or in a thermosetting resin. Hence the properties of the composite structures obtained by said patenteees are not so dependent upon the polymeric metal salt as they are when the latter is the matrix rather than only a coating for the filler. As reported in the Fitzgerald and Nielsen paper metal salts of the polymeric acids, alone, are too brittle for most structural applications.

According to the invention, valuable composite structures are obtained when the polymeric salt is specifically the zinc salt of an acrylic acid polymer and the filler is finely comminuted mica. Employing these two constituents, it is unnecessary to us extraneous polymeric materials, either of the vinyl or of the thermosetting type, for obtaining tough molded products having extremely good resistance to heat.

SUMMARY OF THE INVENTION

The invention provides shaped composite structures comprising finely comminuted mica as reinforcing filler and, as matrix for said mica, the normally solid zinc salt of polyacrylic acid or of a copolymer of acrylic acid and a vinyl monomer copolymerizable therewith, the ratio of said acrylic acid to said vinyl monomer being such that said copolymer consists at least 50 mole percent of acrylic acid units.

The mica may be in the form of a fine powder or thin platelets; and, previous to incorporation with the matrix constituents, it may or may not be pre-treated with a coupling or anchoring agent.

The shaped composites are preferably made by mixing solid, finely comminuted polymer with zinc oxide in a quantity calculated to be approximately that which is stoichiometrically required for reaction of the two carboxy groups of the polymer with one molar equivalent of zinc oxide, contacting the resulting mixture with the mica, and compression molding the whole at a temperature of from about 175° C. to 400° C. and a pressure of from about 5,000 to 50,000 p.s.i.

DESCRIPTION OF THE PREFERRED EMBODIMENTS

The preferred matrix of the presently provided composite structure is a zinc salt of an acrylic acid polymer; the preferred reinforcing filler is mica. The acrylic acid polymer may be a homopolyer of acrylic acid or a copolymer of acrylic acid and a monomer copolymerizable therewith, e.g., a compound having the group

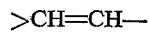

such as vinyl acetate, vinyl chloride, styrene, acrylonitrile, acrylamide, etc. Copolymers of acrylic acid and alkyl acrylates are especially useful, and particularly preferred for the present purpose are copolymers consisting at least 50 mole percent of acrylic acid with the balance being alkyl acrylate units wherein the alkyl radical has from 1 to 12 carbon atoms, e.g., butyl, methyl, ethyl, isopropyl, pentyl, hexyl, 2-ethylhexyl, n-octyl, tert-nonyl, n-decyl, 2-ethylnonyl, or n-dodecyl acrylate. Use of such alkyl acrylate monomers with the acrylic acid appears to contribute to a degree of flexibility of copolymer which is amenable to the preparation of the more useful zinc salts.

The term "finely comminuted mica" as used herein refers to granules, powders, dusts, or thin plates. The powders, dusts, or ground micas may be of any shaped particles; such materials as well as the plateles of mica may have a particle size of, say, less than about 10 microns and may range in size up to about 1,000 microns. Generally, the presently useful, finely comminuted mica will have an average particle size of form, say, about 5 microns to 500 microns. Good results are obtained with mixtures of mica dust and platelets of mica.

The quantity of mica in the composites will vary greatly, depending upon the properties desired; however, in order to impart significant improvement as compared to the unreinforced polymeric material, the mica should be present in a quantity of at least 5 percent by volume of the composite. Mica loadings of as high as about 90 percent by volume are attainable; however, for obtaining the optimum modulus and strength characteristics, it is preferred to employ the mica in a quantity which is from, say about 15% to 60% by volume of the finished composite.

The zinc salt of the acrylic polymer is generally formed in situ during the molding. Preferably, the shaped composite is made by mixing the comminuted mica with the comminuted zinc oxide and the comminuted acrylic polymer and subjecting the resulting mixture to molding conditions. Reaction of the zinc oxide with the carboxy groups of the polymer during the molding occurs by salt formation. The salt thus formed may be a di-salt produced by cross-linking of two carboxy radicals which are present in different polymer chains, or it may be a di-salt formed by intramolecular cyclization of two carboxy groups on the same chain. When excesses of zinc oxide are present, over the quantity required for the formation of the di-salts, the zinc oxide may also react to form the pendent mono-salt, wherein a single carboxy radical of the polymer is changed to the group —C(O)—Zn—OH rather than two carboxy radicals changed to the grouping —C(O)—Zn—O—(O)C— either inter- or intra-molecularly.

Because the di-salts possess more desirable mechanical and temperature properties than do the mono-salts, it will be generally found advantageous to employ the zinc oxide in a quantity which is about that which is stoichimetrically required for reaction of two carboxy groups of the polymer with one molar equivalent of zinc oxide. However, the zinc oxide may be used in lesser or greater quantities. When present in lesser quantities, the product may be substantially free of the mono-salt groups, but it will possess unreacted carboxy radicals. For many purposes, this is not detrimental to satisfactory utilization of the shaped composites. When the zinc oxide is present in a quantity which is more than that required for di-salt formation, the product will generally consist of some mono-salts and some di-salts, and or possibly unreacted zinc oxide. Although such compositional heterogeneity does not result in products of optimum properties, here again, for some applications, the shaped composites are amply useful. Generally, however, it will be found that a mixture of carboxy-containing polymer and zinc oxide in a proportion of from, say, about one mole of zinc oxide per from 1 to 2.5 carboxy radicals of the polymer will give good results when employed with the particulate mica as reinforcing agent.

Previous to incorporation with the zinc oxide and the acrylic polymer, the mica may or may not be pre-treated with an anchoring or bonding agent. Such an agent is usually a difunctional compound having a reactive group which reacts with or becomes otherwise attached, e.g., by hydrogen bonding, to the filler, and another reactive group which reacts with, or is somehow attached to, the resin matrix. An example of a commonly used anchoring agent is γ-aminopropyltriethoxysilane, which is a readily available commercial agent of the family of silane couplers. Other aminoalkylalkoxysilanes which be used are those which are disclosed in U.S. Pat. Nos. 2,832,754 and 2,930,809. Although these couplers or any of the silane couplers are of most interest, other anchoring or coupling agents are likewise useful, e.g., the Werner type complex compounds such as methacrylatochromic chloride or other compounds of this type described in U.S. Pat. No. 2,552,910.

In conducting the molding of the mixture of mica, zinc oxide and acrylic acid polymer, it has been found to be advantageous to allow the polymer to soften and flow in the mold before the temperature is raised to that which favors reaction of zinc oxide with the carboxylic groups of the polymer. For that reason, the molding cycle preferably includes gradual increase of the temperature to about 130 to 250° C. while increasing the pressure, whereby intimate contact of the reactants is obtained and dimensional conformity to the mold surfaces is realized. For salt-formation, a temperature of about 300° C. gives optimum results; generally, depending upon the nature of the polymer and the zinc oxide: polymer ratio, a temperature range of, say, from about 250° C. to 350° C. and pressures of from about 5,000 to 50,000 p.s.i., preferably from 7,500 to 15,000 p.s.i., will be used after the initial flow period. During the molding cycle, the pressure is advantageously released from time to time in order to permit the evolved water vapor to escape before the final molding temperature is reached. In experimental runs, the completeness of the chemical reaction, and hence of the molding process, may be checked by X-ray analyses of the metal oxide and by infrared analyses of the carboxylic acid group in the molded specimen.

Although the high temperatures and pressures which are used during the molding would suggest the possibility of reaction which might give degradation of filler strength, in the present instance, whether or not the mica has been pre-treated with a coupling agent, no weakening of the mica takes place, as is evident from the very good mechanical and thermal properties of the composite.

The invention is further illustrated by, but not limited to, the following examples:

EXAMPLE 1

Employing a Spex mixer containing 2 plexiglas balls, 10 g. of powdered (94:6 weight ratio) acrylic acid/2-ethylhexyl acrylate copolymer were mixed with 5.3 g. of powdered zinc oxide for about 10 minutes. The mixture thus obtained is hereinafter referred to as (A). To 13.5 g. of powdered mica (micro-mica, MC-3000, English Mica Co., Kings Mountain, N.C., there was added a sufficient quantity of (A) to give a mixture having a volume fraction of 40 percent mica. The whole was mixed for 5 minutes in the same type of mixer, and the resulting mix was used to make molded test specimens, employing the following molding cycle:

to 200° C. at 10,000 p.s.i. 15 min., then vent
to 250° C., at 10,000 p.s.i. 5 min., then vent
at 250° C., at 10,000 p.s.i. 15 min., then vent
at 250° C. at 10,000 p.s.i. 15 min., then vent
to 300° C. at 10,000 p.s.i. 15 min., then vent
at 300° C. at 10,000 p.s.i. 10 min., then vent
at 300° C. at 10,000 p.s.i. 5 min., then vent Cooling to 100° C. was conducted during 26 minutes while maintaining the 10,000 p.s.i. pressure. Then pressure was discontinued and the molded specimens were allowed to attain room temperature before removal from the press. All of the specimens had very smooth surfaces and were colored a uniform tan.

Dynamic mechanical tests, which give shear modulus, and mechanical damping (logarithmic decrement) tests were conducted, using the recording torsion pendulum method described by L. E. Nielsen in Review of Scientific Instruments, 22, 690 (1951) with 4″ x ⅜″ x 0.30″ molded test specimens. Flexural tests were also conducted on the Instron Tester, using 0.035″ thick specimens over a span of 1 inch. Coefficient of thermal expansion tests were made in the thermal distortion apparatus described by L. E. Nielsen in Transactions of the Society of Rheology, 9, 243 (1965). The linear coefficient of thermal expansion was determined from the total change in length of 4″ specimens during the temperature interval of 30° to 150° C. as the temperature of the test chamber was increased at a rate of 2° C. per minute. Fused quartz rods were used to calibrate the apparatus. The following results were obtained:

Shear modulus: $1.81 \times 10^{11}$ dynes/cm.$^2$
Flexural modulus: 4,740,000 p.s.i.
Flexural strength: 15,800 p.s.i.
Coefficient of thermal expansion: $1.29° C. \times 10^{-5}$

EXAMPLE 2

The micro-mica described in Example 1 was treated with a 1% aqueous solution of the silane coupler, γ-aminopropyltriethoxysilane, to give a dried product having an 0.5% by weight content of the said coupler. The dry material was then mixed with the acrylic acid-2-ethylhexyl acrylate copolymer plus zinc oxide mixture which is identified as (A) in Example 1, the quantity of the mica being such that it amounted to a volume fraction of 40% of the whole. Molding was conducted as in Example 1 to give well-dimensioned test specimens having an average flexural modulus of 5,551,000 p.s.i. and a flexural strength of 18,850 p.s.i. when evaluated as in Example 1.

The invention thus provides very heat-resistant, tough, shaped composite structures which, depending upon the configuration of the mold, are useful in numerous industrial and space applications wherein high-strength, thermally stable components are required; e.g., rocket nozzles, diffusers, missile re-entry skin panels, rocket combustion insulators, and high temperature insulators of all kind.

It is to be understood that changes and variation may be made without departing from the spirit and scope of the invention as defined in the appended claims.

What we claim is:

1. A shaped composite structure comprising mica as a reinforcing filler in a matrix comprising the normally solid zinc salt of a copolymer of acrylic acid and a vinyl monomer copolymerizable therewith, the ratio of said acrylic acid to said vinyl monomer being such that said copolymer consists of at least 50 mole percent of acrylic acid units, said structure having been prepared by compression molding, at a temperature of about 175° C. to 400° C. and a pressure of from about 5,000 to 50,000 p.s.i., a finely comminuted mixture of zinc oxide and said copolymer in contact with the mica, the quantity of oxide in the mixture being approximately that which is stoichiometrically required for reaction of two carboxy groups of the copolymer with one molar equivalent of the oxide.

2. The structure defined in claim 1, further limited in that said mica has been pre-treated with a silane coupling agent.

3. The structure defined in claim 1, further limited in that the polymer is a copolymer of acrylic acid and a vinyl monomer copolymerizable therewith, the ratio of said acrylic acid to said vinyl monomer being such that said copolymer consists at least 50 mole percent of acrylic acid units.

4. The structure defined in claim 1, further limited in that the polymer is a copolymer of acrylic acid and an alkyl acrylate having 1 to 12 carbon atoms in the alkyl radical and consisting at least 50 mole percent of acrylic acid units.

5. The structure defined in claim 1, further limited in that the polymer is a copolymer of acrylic acid and 2-ethylhexyl acrylate and consists at least 50 mole percent of acrylic acid units.

References Cited

UNITED STATES PATENTS

| | | | |
|---|---|---|---|
| 3,322,734 | 5/1967 | Rees | 260—79.3 |
| 3,471,435 | 10/1969 | Miller | 260—37 |

OTHER REFERENCES

Fitzgerald et al., Viscoelastic properties of the salts of some polymeric acids, In Royal Society of London, Ser. A, vol. 282, Oct 20, 1964, pp. 137–146.

Modern Plastics Encyclopedia 1967, vol. 44, No. 1A, September 1966, pp. 416, 417, 457, 590 and 591.

ALLAN LIEBERMAN, Primary Examiner

J. H. DERRINGTON, Assistant Examiner

U.S. Cl. X.R.

161—171